United States Patent
Kakinuki

(10) Patent No.: US 11,208,266 B2
(45) Date of Patent: Dec. 28, 2021

(54) AUTOMATED STOREROOM SYSTEM

(71) Applicant: Murata Machinery, Ltd., Kyoto (JP)

(72) Inventor: Tsuyoshi Kakinuki, Inuyama (JP)

(73) Assignee: Murata Machinery, Ltd., Kyoto (JP)

( * ) Notice: Subject to any disclaimer, the term of this patent is extended or adjusted under 35 U.S.C. 154(b) by 14 days.

(21) Appl. No.: 16/971,651

(22) PCT Filed: Feb. 13, 2019

(86) PCT No.: PCT/JP2019/005010
§ 371 (c)(1),
(2) Date: Aug. 20, 2020

(87) PCT Pub. No.: WO2019/181283
PCT Pub. Date: Sep. 26, 2019

(65) Prior Publication Data
US 2020/0391944 A1 Dec. 17, 2020

(30) Foreign Application Priority Data
Mar. 19, 2018 (JP) .............................. JP2018-050650

(51) Int. Cl.
*B65G 1/137* (2006.01)
*B65G 1/04* (2006.01)

(52) U.S. Cl.
CPC .......... *B65G 1/137* (2013.01); *B65G 1/0407* (2013.01); *B65G 1/0492* (2013.01)

(58) Field of Classification Search
CPC combination set(s) only.
See application file for complete search history.

(56) References Cited

U.S. PATENT DOCUMENTS 5,340,262 A * 8/1994 Tsujimoto .............. G06Q 10/08
414/273
5,564,528 A * 10/1996 Goto ....................... B66F 9/205
187/261

(Continued)

FOREIGN PATENT DOCUMENTS

| JP | 11-116004 A | 4/1999 |
| JP | 11-116005 A | 4/1999 |

(Continued)

*Primary Examiner* — Kyle O Logan
(74) *Attorney, Agent, or Firm* — DLA Piper LLP (US)

(57) ABSTRACT

An automated storeroom system includes a plurality of automated storerooms including a rack extending in a first horizontal direction and having a plurality of shelves, and a stacker crane configured to travel on a crane passage along the rack, the automated storerooms disposed adjacent to each other in a second horizontal direction perpendicular to the first horizontal direction with back parts of the racks being close to each other; a transport vehicle configured to travel along a transport vehicle travelling passage provided in a lower portion of the rack and extending in the first horizontal direction; and a travelling restriction member disposed between the crane passage and a front part of the rack facing the crane passage, the travelling restriction member being movable between a travelling restriction position that restricts travelling of a worker and a travelling non-restriction position adapted to remove the restriction.

15 Claims, 10 Drawing Sheets

(56) References Cited

U.S. PATENT DOCUMENTS

| | | | | |
|---|---|---|---|---|
| 7,729,797 B2* | 6/2010 | Akamatsu | ............ | B65G 1/0421 |
| | | | | 700/214 |
| 7,787,985 B2* | 8/2010 | Tsujimoto | ............ | B65G 1/0407 |
| | | | | 700/214 |
| 8,670,861 B2* | 3/2014 | Yoshinaga | ............ | B65G 1/0407 |
| | | | | 700/218 |
| 9,452,886 B2* | 9/2016 | Yamashita | ............ | B65G 1/1378 |
| 10,067,501 B2* | 9/2018 | Wurman | .......... | G05B 19/41895 |
| 10,710,803 B2* | 7/2020 | Grosse | ................ | B65G 1/0435 |
| 2011/0097182 A1* | 4/2011 | Schmit | ................ | B65G 1/0407 |
| | | | | 414/277 |
| 2014/0301810 A1* | 10/2014 | Steinbach | ............ | B65G 1/0492 |
| | | | | 414/273 |
| 2017/0152106 A1* | 6/2017 | Hofmann | ............. | B65G 1/0407 |
| 2017/0203920 A1* | 7/2017 | Otto | ..................... | B65G 1/0492 |
| 2017/0203921 A1* | 7/2017 | Issing | ..................... | B65G 1/06 |
| 2018/0141751 A1 | 5/2018 | Muranaka | | |
| 2020/0087070 A1 | 3/2020 | Kakinuki | | |

FOREIGN PATENT DOCUMENTS

| | | |
|---|---|---|
| JP | 11-116006 A | 4/1999 |
| JP | 11-165811 A | 6/1999 |
| JP | 2002-154607 A | 5/2002 |
| JP | 3317551 B2 | 8/2002 |
| JP | 2007-217116 A | 8/2007 |
| WO | 2016/181734 A1 | 11/2016 |
| WO | 2019/008999 A1 | 1/2019 |

* cited by examiner

AUTOMATED STOREROOM SYSTEM

TECHNICAL FIELD

This disclosure relates to an automated storeroom system.

BACKGROUND

Conventionally, an automated storeroom system is known that includes a plurality of automated storerooms each having racks and a stacker crane, and transport vehicles configured to travel along a preset route to load and unload articles into and from the automated storerooms (e.g., see JP-A-Hei 11-116004).

In the automated storeroom system recited in JP-A-Hei 11-116004, a system area is made compact by using the inside of a rack as a standby position for a transport vehicle.

Thus, the lowest shelf of the rack is open toward the crane passage so that the stacker crane can transfer an article to and from racks on both sides. Therefore, when the stacker crane is under maintenance, the worker in the crane passage may mistakenly travel to the next crane passage through the lowest shelf of the rack.

In that instance, it is impossible to provide a fence between the neighboring racks in a structure where the transport vehicle transfers an article or moves between the adjacent racks.

Accordingly, to ensure the safety of workers, it is necessary to stop the operation of the stacker crane in the automated storeroom adjacent to a rack in which a stacker crane is under maintenance. Therefore, the operation capacity of the whole automated storeroom is decreased.

It could therefore be helpful to provide a means to operate stacker cranes other than a stacker crane under maintenance in an automated storeroom system in which a transport vehicle travels through a lower portion of the rack.

SUMMARY

I Thus Provide:

Aspects are explained below. These aspects can be arbitrarily combined as needed.

An automated storeroom system according to one aspect includes a plurality of automated storerooms, a transport vehicle, and a travelling restriction member.

The automated storerooms include a rack and a stacker crane. The rack extends in a first horizontal direction and has a plurality of shelves. The stacker crane travels on a crane passage along the rack. The automated storerooms are disposed adjacent to each other in a second horizontal direction perpendicular to the first horizontal direction with back parts of the racks being close to each other.

The transport vehicle travels along a transport vehicle travelling passage provided in a lower portion of the rack and extending in the first horizontal direction.

The travelling restriction member is disposed between the crane passage and a front part of the rack facing the crane passage. The travelling restriction member moves between a travelling restriction position for restricting travelling of a worker and a travelling non-restriction position for removing the restriction.

According to the system, when the stacker crane is under maintenance, the travelling restriction member can be positioned at the travelling restriction position. Accordingly, the worker who is maintaining the stacker crane cannot travel from the crane passage where he or she stands to a next crane passage. In addition, the worker cannot travel to the transport vehicle travelling passage in the rack lower portion, which ensures the safety of the worker. As a result, it is possible to operate stacker cranes other than a stacker crane under maintenance.

"The travelling restriction member is positioned at the travelling restriction position" means that the travelling restriction member is in a condition to completely or partially restrict travelling of the worker.

The automated storeroom system may further include a controller that performs automatic operation of the stacker cranes.

The controller may perform the automatic operation of the stacker crane when the controller determines that the travelling restriction member is positioned at the travelling restriction position even if an automated storeroom disposed next to the concerned automated storeroom is under maintenance.

According to the system, even if the stacker crane is under maintenance, it is possible to operate the stacker crane in a rack next to a rack in which the stacker crane is under maintenance. The reason is that the controller can confirm the safety of the worker by the travelling restriction member. As a result, it is possible to decrease bad effects to the whole operation of the automated storeroom system due to the maintenance.

If one of the stacker cranes is abnormally stopped, the controller may perform following steps of:
stopping the automatic operation of other stacker cranes;
moving the travelling restriction member from the travelling restriction position to the travelling non-restriction position; and
restarting the automatic operation of the other stacker cranes.

The automated storeroom system may further include a controller that performs the automatic operation of the transport vehicle.

If the controller determines that the travelling restriction member is positioned at the travelling restriction position, the controller allows the transport vehicle to travel along the transport vehicle travelling passage provided in a lower portion of the rack even if an automated storeroom disposed next to the concerned automated storeroom is under maintenance.

The travelling restriction member may be in a retreated position lower than an opening portion of the lowest shelf of the rack when the travelling restriction member is positioned at the travelling non-restriction position. The travelling restriction member may be in a partition position to form a partition at the opening portion of the lowest shelf of the rack when the travelling restriction member is positioned at the travelling restriction position.

According to the system, since the travelling restriction member is retreated below the opening portion of the lowest shelf of the rack when the travelling restriction member is positioned at the travelling non-restriction position, it is possible to use lower dead spaces effectively.

The travelling restriction member may be a member flexible with a predetermined rigidity. The travelling restriction member may take a wound posture at the travelling non-restriction position, and take an upwardly unwound posture at the travelling restriction position.

The travelling restriction member may be stick-like member. The travelling restriction member may take a standing posture near a side frame of the opening portion of the lowest shelf of the rack when the travelling restriction member is positioned at the travelling non-restriction position, and may take a lying posture partitioning the opening portion of the lowest shelf of the rack off the crane passage when the travelling restriction member is positioned at the travelling restriction position.

According to the system, it is possible to realize the travelling restriction member with a simple structure.

The automated storeroom system may further include a second travelling restriction member. The second travelling restriction member may be disposed between the crane passage and a front part of the rack facing the crane passage where the travelling restriction member is not provided. The second travelling restriction member is fixed to a portion facing the crane passage. According to the system, providing the second travelling restriction member makes it possible to decrease the location of the travelling restriction member.

In the automated storeroom system, it is possible to operate stacker cranes other than a stacker crane under maintenance.

REFERENCE SIGNS LIST

Figure 1:
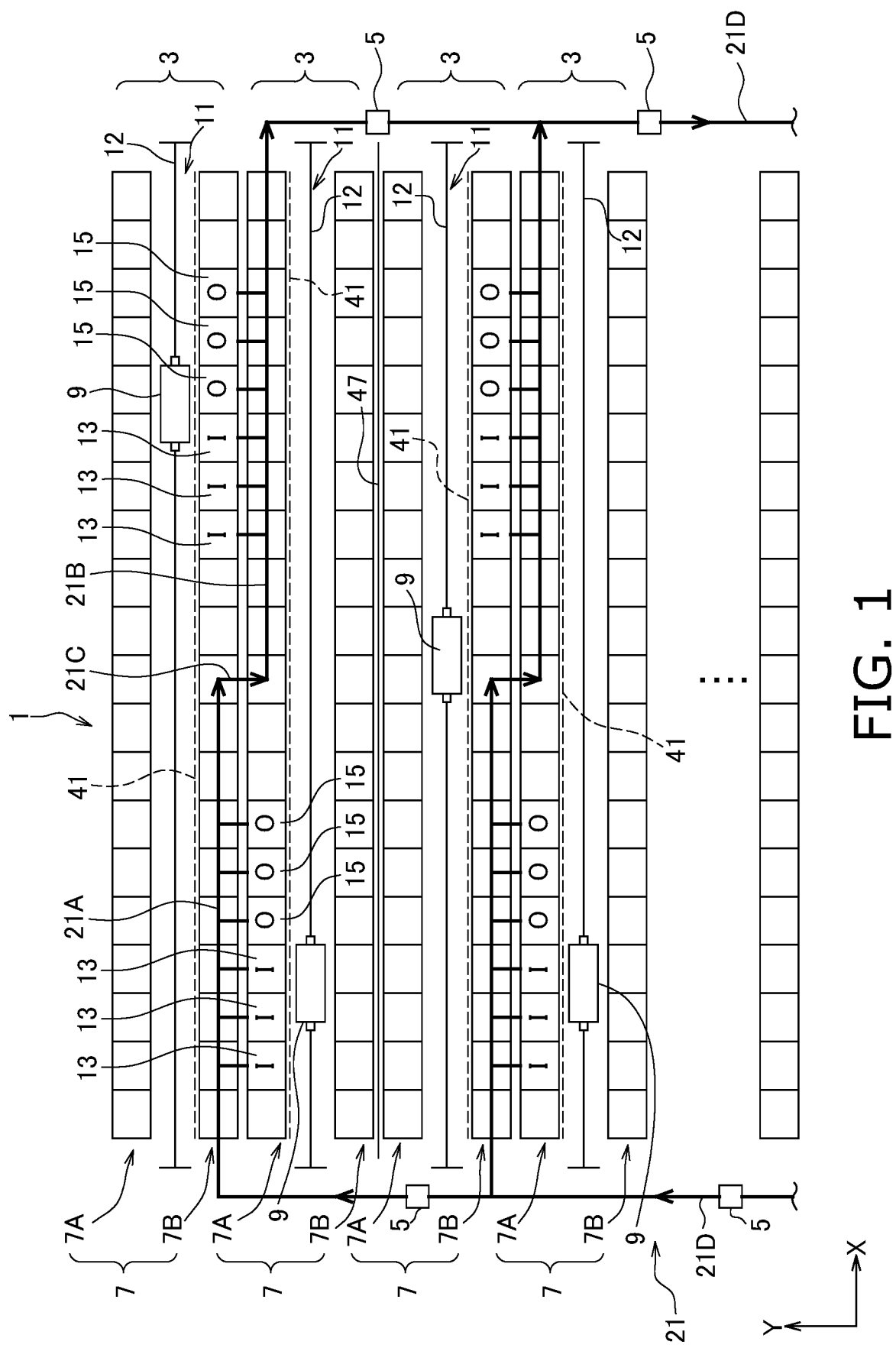
FIG. 1 is a schematic plan view illustrating an arrangement structure of an automated storeroom system according to a first example.

1: automated storeroom system
1A: automated storeroom system
1B: automated storeroom system
1C: automated storeroom system
3: automated storeroom
5: transport vehicle
7: rack
7A: first rack
7B: second rack
7a: shelf
7b: opening portion
9: stacker crane
11: crane passage
12: travelling rails
13: loading port
15: unloading port
21: route
21A: first route
21B: second route
21C: connection route
21D: circulation route
23: vehicle body
25: lifter
31: placement platform
31a: underneath entering space
33: post
35: article support member
41: travelling restriction device
41A: travelling restriction device
43: travelling restriction member
45: driving device
50: controller
53: fixed travelling restriction member
61: travelling restriction device
63: travelling restriction member
A: article
F: floor
W: worker

DETAILED DESCRIPTION

1. First Example (1) Whole Structure

Figure 2:
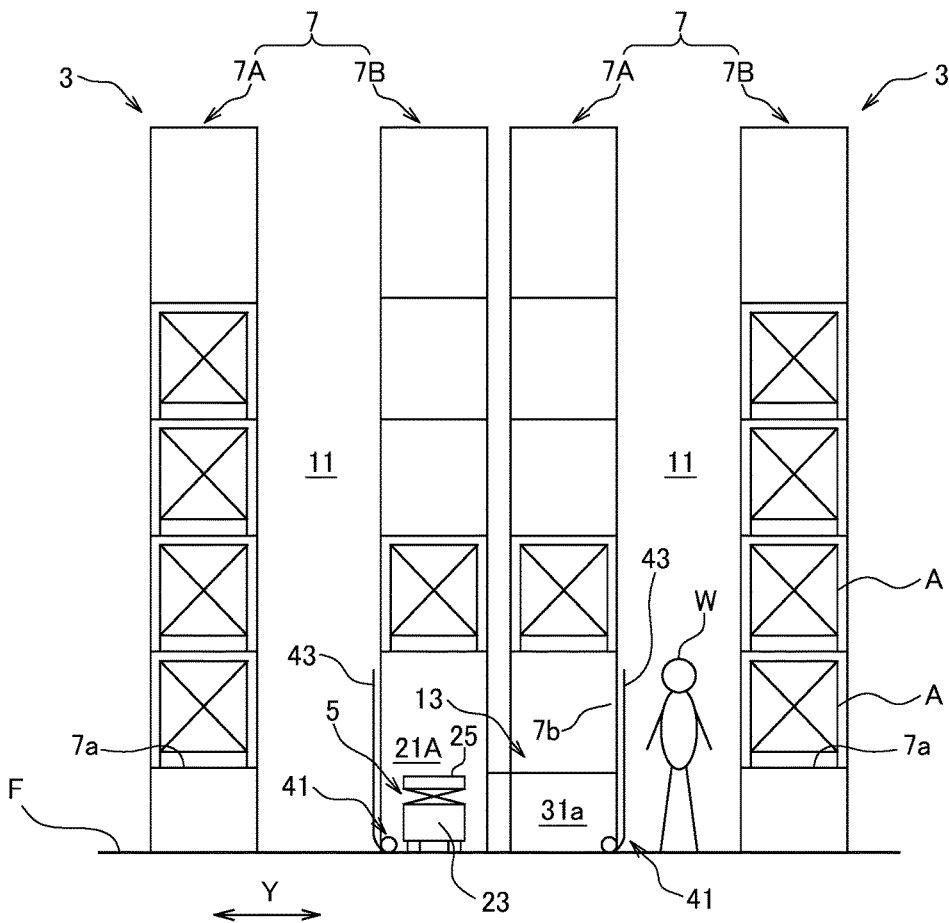
FIG. 2 is a schematic front view illustrating the automated storeroom system.

Referring to FIGS. 1 and 2, an automated storeroom system 1 related to the first example will be explained. FIG. 1 is a schematic plan view illustrating an arrangement structure of an automated storeroom system according to a first example. FIG. 2 is a schematic front view illustrating the automated storeroom system.

The automated storeroom system 1 includes a plurality of automated storerooms 3, and a plurality of transport vehicles 5.

Each automated storeroom 3 includes a pair of racks 7 (a first rack 7A and a second rack 7B), and a stacker crane 9. The automated storerooms 3 are disposed so that back parts of the racks are adjacent to each other. The transport vehicle 5 loads or unloads an article A to or from the automated storerooms 3.

Below, the longitudinal direction of the rack 7 is a first horizontal direction shown by an arrow X. The direction in which the automated storerooms 3 are arranged is a second horizontal direction shown by an arrow Y, which is perpendicular to the first horizontal direction.

(2) Automated Storeroom

The automated storeroom 3 uses the corresponding stacker crane 9 to automatically store therein an article A conveyed by a transport vehicle 5 and also uses the stacker crane 9 to automatically take out therefrom the stored article A. The automated storerooms 3 are disposed in parallel along the second horizontal direction.

Each automated storeroom 3 includes a first rack 7A and a second rack 7B. The longitudinal direction of the first rack 7A and the second rack 7B corresponds to the first horizontal direction. They are disposed in a manner spaced apart from each other in the second horizontal direction. Each rack 7 has a plurality of shelves 7a, in each of which an article A is to be placed, in the first horizontal direction and in the vertical direction. Accordingly, the rack 7 stores the articles A in a matrix constituted of the first horizontal direction and the vertical direction.

A first rack 7A that is a rack 7 in one automated storeroom 3 of an adjacent pair of automated storerooms 3 and a second rack 7B that is a rack 7 in the other automated storeroom 3 thereof are disposed closely back to back.

(3) Stacker Crane

Each stacker crane 9 travels on a travelling rail 12 that extends at the crane passage 11 along the first horizontal direction between racks 7 that are opposed in the second horizontal direction in the corresponding automated storeroom 3. The stacker crane 9 includes: a travelling vehicle (not shown) that can travel along the travelling rail 12; and a lifting platform (not shown) that can ascend and descend along a mast on this travelling vehicle and is provided with a transfer device.

The stacker crane 9 conveys an article A among the shelves 7a of the racks 7 and a loading port 13 and an unloading port 15 described later. The transfer device of the stacker crane 90 transfers (loads or unloads) an article A onto or from the shelves 7a of the rack 7, the loading port 13, and the unloading port 15. A transfer device of the stacker crane 9 is known.

(4) Transport Vehicle

Each transport vehicle 5 is a vehicle that transports the article that travels without a driver. The transport vehicle 5 travels along a preset route 21. The transport vehicle 5 can transfer an article A between the loading port 13 and the unloading port 15. As a transport vehicle 5, an automatic guided vehicle (AGV) is used. The transport vehicle 5 includes a vehicle body 23 configured to be guided by the route 21 to travel and a lifter 25 as a transfer device provided on the vehicle body 23 and configured to raise and lower an article A. A guiding system employed by the transport vehicle 5 is known.

(5) Travelling Route for Transport Vehicle

The route 21, along which the transport vehicle 5 travels, includes first routes 21A, second routes 21B, connection routes 21C, and a circulation route 21D. Each group of the first route 21A, the second route 21B, and the connection routes 21C belongs to different automated storeroom 3, and is provided in the second rack 7B and the first rack 7A that are adjacent to each other back to back.

Each first route 21A passes through a lower portion of the corresponding first rack 7A in the first horizontal direction. The lower portion of the second rack 7B corresponds to, as shown in FIG. 2, the lowest shelves 7a of the second rack 7B and a space lower than the lowest shelves 7a, and is a space part extending over a predetermined length above a floor F in the second rack 7B. This space part extends to pass through along the first horizontal direction. In this space part, structural members such as lattices are not provided. The first route 21A is a one-way traffic route along which each transport vehicle 5 travels only in one direction. The one-way traffic directions of the respective first routes 21A of the automated storerooms 3 are the same direction. In the illustrated example, each first route 21A is provided from one end of the lower portion of the corresponding first rack 7A to a central position thereof in the first horizontal direction.

In each first route 21A, the transport vehicle 5 travels to the first rack 7A and transfers an article A to or from the first rack 7A. In a lower portion of the first rack 7A into which an article A is to be transferred from the first route 21A by the transport vehicle 5, loading ports 13 and unloading ports 15 are provided.

The loading port 13 is, at a level corresponding to the lowest shelf 7a of the first rack 7A, provided in plurality (herein, three) in a row to be adjacent to each other in the first horizontal direction. The unloading port 15 is, at a level corresponding to the lowest shelf 7a of the first rack 7A, provided in plurality (herein, three) in a row to be adjacent to each other in the first horizontal direction. A group of the loading ports 13 is adjacent to a group of the unloading ports 15 in the first horizontal direction.

Between the lower portion of each first rack 7A and the lower portion of the corresponding second rack 7B, transfer spaces are provided each of which is a space allowing the transport vehicle 5 to travel. Each transfer space extends to pass through in the second horizontal direction. In the transfer space, structural members such as lattices and back-side braces are not provided.

Each second route 21B passes through the lower portion of the corresponding first rack 7A in the first horizontal direction. Each second route 21B is provided from the other end (the end opposite to the first route side) of the lower portion of the corresponding first rack 7A to a central position thereof in the first horizontal direction. The second route 21B is the same as the first route 21A, and the explanation thereof will be omitted.

The connection route 21C connects the first route 21A and the second route 21B to each other. Specifically, each connection route 21C is provided at the lower portions of the first rack 7A and 7B that are arranged in the second horizontal direction. More specifically, the connection route 21C is provided midway (at a center, herein) between the first rack 7A and the second rack 7A in the first horizontal direction.

The connection route 21C is a one-way traffic route along which each transport vehicle 5 travels only in one direction. Above each connection route 21C, a connecting space for a transport vehicle 5 to pass therethrough is formed. The connecting space extends to pass through in the second horizontal direction. In this connecting space, structural members such as lattices and back-side braces are not provided. The first route 21A, the second route 21B, and the connection route 21C may allow bidirectional passage.

The circulation route 21D is connected to the first routes 21A and the second routes 21B outside the racks 7. The circulation route 21D is a one-way traffic route along which each transport vehicle 5 travels in one direction.

In the illustrated example, the circulation route 21D is connected to upstream sides of the first routes 21A outside the racks 7. The circulation route 21D is also connected to downstream sides of the second routes 21B outside the racks 7. The circulation route 21D extends continuously from the downstream sides of the second routes 21B to the upstream sides of the first routes 21A.

In the route 21 configured as described above, each transport vehicle 5 enters the first route 21A from the circulation route 21D, travels along the first route 21A, and travels to the corresponding second route 21B through the corresponding connection route 21C. The transport vehicle 5 travels along the second route 21B and exits into the circulation route 21D. Subsequently, the transport vehicle 5 travels along the circulation route 21D to enter the first route 21A again.

(6) Loading Operation and Unloading Operation

Figure 3:
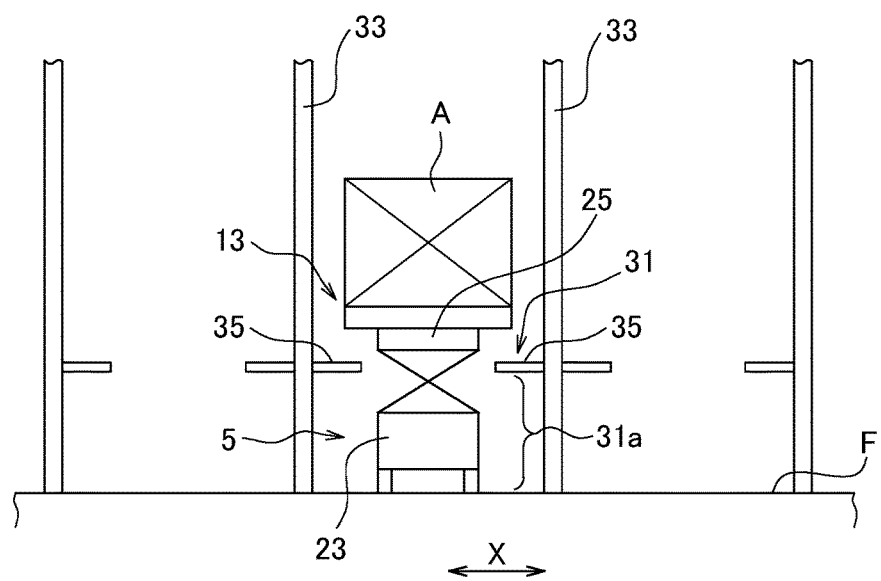
FIG. 3 is a front view illustrating loading ports of the automated storeroom system.
Figure 4:
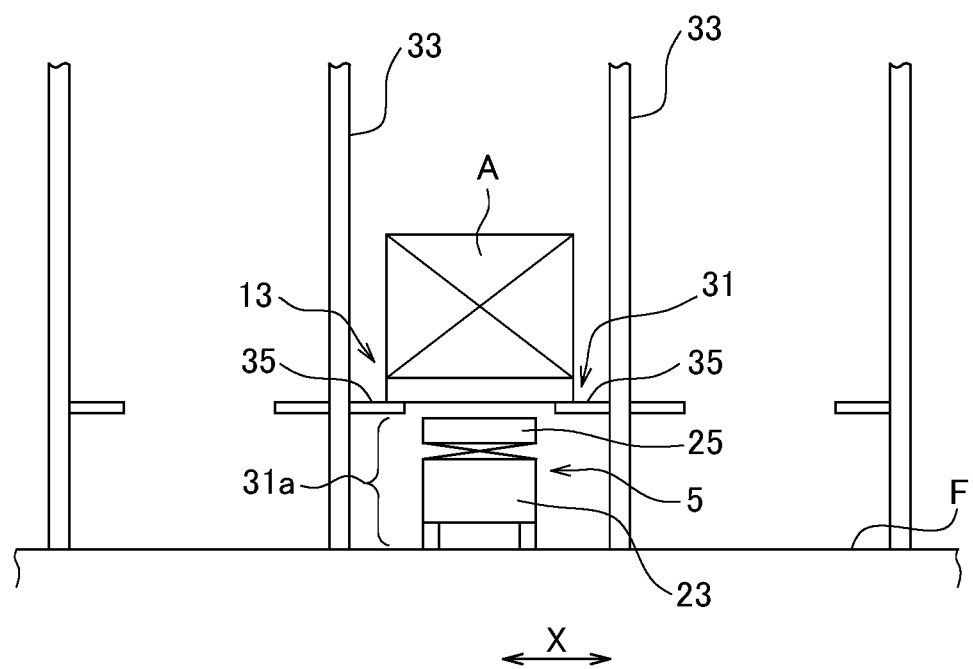
FIG. 4 is another front view illustrating the other loading ports of the automated storeroom system.

Using FIGS. 3 and 4, configuration of the loading port 13 and the unloading port 15 as well as the loading and the unloading operations of the transport vehicle 5 will be explained. FIG. 3 is a front view illustrating loading ports of the automated storeroom system. FIG. 4 is another front view illustrating the loading ports of the automated storeroom system.

At each loading port 13, an article A is loaded into the corresponding automated storeroom 3 by a transport vehicle 5. The loading port 13 is provided with a placement platform 31 on which an article A is to be placed. The placement platform 31 has an underneath entering space 31a allowing a transport vehicle 5 to enter below the placement platform 31. The placement platform 31 is configured with article support members 35 that are each provided to a pair of posts 33 adjacent to each other in the first horizontal direction in the rack 7. The posts 33 are provided in a manner spaced apart from each other by a distance greater than the width of the transport vehicle 5 in the first horizontal direction. The distance between the article support members 35 is greater than the width of the lifter 25 in the first horizontal direction. The distance between the article support members 35 is smaller than the width of the article A in the first horizontal direction. The underneath entering space 31a is formed by a space between the article support members 35 and the floor F.

Next, the loading operation of the transport vehicle 5 will be explained.

As illustrated in FIG. 3, a transport vehicle 5 conveying an article A placed on the lifter 25 thereof that has been raised enters a loading port 13 from the corresponding first route 21A.

The transport vehicle 5 moves to a position where the vehicle body 23 has completely entered the corresponding underneath entering space 31a to stop, and then the lifter 25 is lowered, whereby the article A is transferred from the transport vehicle 5 onto the corresponding placement platform 31, as shown in FIG. 4. Thus, the loading of the article A is completed.

Subsequently, the transport vehicle 5 returns to the first route 21A with the lifter 25 left being lowered, e.g., and travels along the first route 21A.

Since the unloading operation at the unloading port 15 is performed as a reverse operation of the loading operation at the loading port 13, the explanation thereof will be omitted.

(7) Basic Operation

As described above, in the automated storeroom system 1, in the lower portion of each first rack 7A and the lower portion of the corresponding second rack 7B, the corresponding first route 21A, the corresponding second route 21B, and the corresponding connection route 21C are provided as the route 21 along which each transport vehicle 5 travels. Accordingly, the transport vehicle 5 can travel in a crank-like manner routed from the lower portion of the first rack 7A to the lower portion of the second rack 7B. At this time, the transport vehicle 5 can transfer an article A from the first route 21A onto the second rack 7B, and can transfer an article A from the second route 21B onto the first rack 7A.

As a result, in the automated storeroom system 1, by using the lower portions of the racks 7, passing of a transport vehicle 5 and loading and unloading by the transport vehicle 5 can be performed. This enables many articles A to be loaded and unloaded in a small space. Furthermore, the footprint of the automated storeroom system 1 can be reduced.

In addition, many loading ports 13 and unloading ports 15 can be provided, and thus operation flexibility of each stacker crane 9 can be increased.

(8) Travelling Restriction Device

Figure 5:
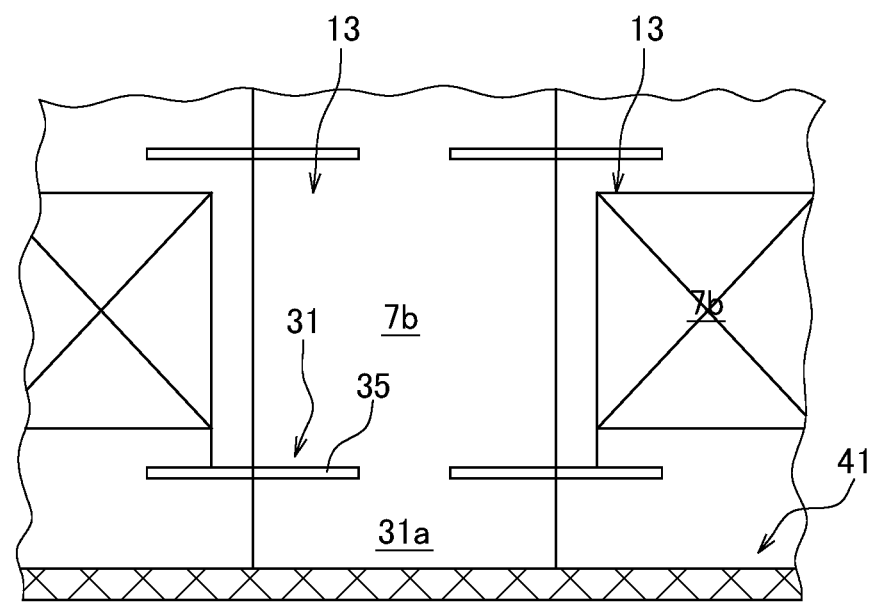
FIG. 5 is a view illustrating the lowest shelf of the rack seen from the crane passage side.
Figure 6:
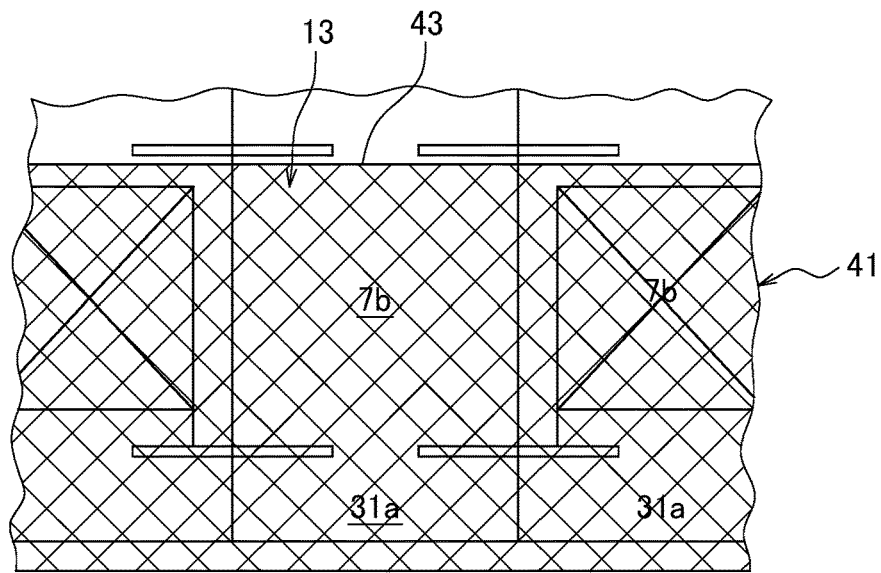
FIG. 6 is a view illustrating the lowest shelf of the rack seen from the crane passage side.

Referring to FIGS. 5 and 6, the travelling restriction device 41 will be explained. FIG. 5 is a view illustrating the lowest shelf of the rack seen from the crane passage side. FIG. 6 is a view illustrating the lowest shelf of the rack seen from the crane passage side. The travelling restriction device 41 is a device that restricts the worker W performing the maintenance or recovery of the stacker crane 9 from travelling from the crane passage 11 to a next crane passage 11.

Specifically, the loading ports 13 and the unloading ports 15 have an opening portion 7b on the side of the crane passage 11 so that the stacker crane 9 can access the loading ports 13 and the unloading ports 15. The opening portion 7b has to be open while the stacker crane 9 normally operates. Therefore, when abnormalities occur in the stacker crane 9 and the worker W maintains the stacker crane 9, it may happen that worker W travels from the opening portion 7b to the other crane passage 11.

The travelling restriction device 41 includes a travelling restriction member 43. The travelling restriction member 43 is, as shown in FIG. 2, provided between the crane passage 11 and a front part of the rack 7 facing the crane passage 11. More specifically, the travelling restriction member 43 is provided at the front part where the opening portions 7b of the loading ports 13 and the unloading ports 15 of the rack 7 are formed. The travelling restriction member 43 can move between a travelling restriction position for restricting travelling of the worker W, and a travelling non-restriction position for removing the restriction. Accordingly, the travelling restriction member 43 functions as an invasion prevention fence or barrier at the travelling restriction position. More specifically, the travelling restriction member 43 is provided closer to the crane passage 11 than a space of the lower portion of the rack 7 through which the transport vehicle 5 passes, and is provided closer to the rack 7 than the space through which the stacker crane 9 passes.

Specifically, the travelling restriction member 43 is a net flexible with a predetermined rigidity.

The travelling restriction member 43 is, as shown in FIGS. 2 and 5, in a retreated position that is lower than the lowest opening portions 7b of the rack 7 when it is positioned at the travelling non-restriction position, and is more specifically in a wound state. As mentioned above, since the travelling restriction member 43 is in a retreated position lower than the lowest opening portion 7b of the rack 7 when the travelling restriction member 43 is positioned at the travelling non-restriction position, a lower dead space can be effectively used.

The travelling restriction member 43 is, as shown in FIGS. 2 and 6, in a position where the travelling restriction member 43 covers the lowest opening portions 7b of the rack 7 (including the opening portions 7b of the loading ports 13 and the unloading ports 15) at the travelling restriction position. Accordingly, the travelling restriction member 43 also covers the underneath entering space 31a below the opening portions 7b.

Figure 7:
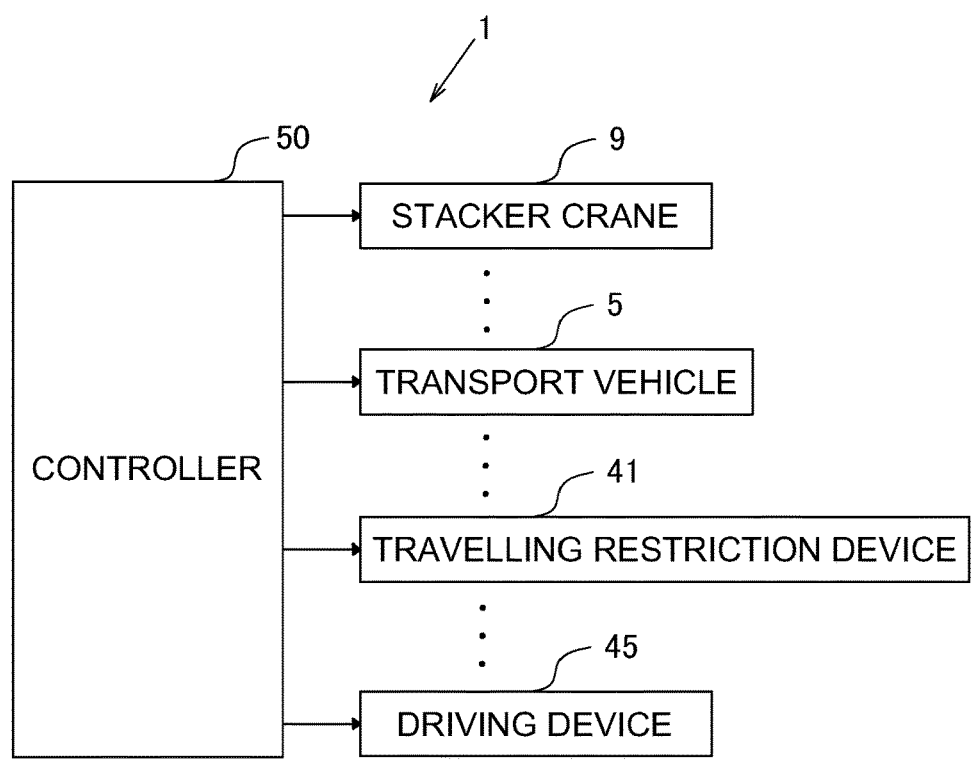
FIG. 7 is a block diagram illustrating a control configuration of the automated storeroom system.

The travelling restriction device 41 includes a driving device 45, as shown in FIG. 7, configured to drive the travelling restriction member 43. The driving device 45 includes a motor (not shown) for winding and unwinding the travelling restriction member 43. Accordingly, the travelling restriction member 43 can take a wound posture at the travelling non-restriction position, and an upwardly unwound posture at the travelling restriction position.

Accordingly, when the stacker crane 9 is under maintenance, it is possible to locate the travelling restriction member 43 at the travelling restriction position. Accordingly, as shown in FIG. 2, the worker W maintaining the stacker crane 9 cannot travel from the crane passage 11 to next crane passages 11. Accordingly, it is possible to ensure the safety of the worker W. As a result, stacker cranes 9 other than a stacker crane 9 under maintenance can be operated.

"Travelling restriction member 43 is positioned at the travelling restriction position" means a state in which the travelling restriction member 43 completely or partially restricts travelling of the worker W. Accordingly, although the travelling restriction member 43 in a previous example completely covers the lowest opening portions 7b of the rack 7 at the travelling restriction position, the travelling restriction member may partially cover the opening portions 7b.

A fixed travelling restriction member 47 is provided between the first rack 7A and the second rack 7B whose back parts are adjacent to each other, wherein the first rack 7A and the second rack 7B do not include a transport route of the transport vehicles 5.

(9) Control Configuration

A control configuration of the automated storeroom system 1 will be described with reference to FIG. 7. FIG. 7 is a block diagram illustrating a control configuration of the automated storeroom system.

As shown in FIG. 7, the automated storeroom system 1 includes a controller 50. The controller 50 is a device that controls the automated storeroom system 1.

The controller 50 is a computer system including a processor (e.g. a CPU), a storage device (e.g. a ROM, a RAM, an HDD, an SSD and the like), and various interfaces (e.g. an A/D converter, a D/A converter, a communication interface and the like). The controller 50 executes a program stored in a storage unit (corresponding to a part or the whole of storage area of the storage device) to perform various control operations.

The controller 50 may be constituted of a single processor or a plurality of processors independent of each other for individual controls.

Some or the whole of functions of individual elements of the controller 50 may be realized as a program that can be executed by the computer system constituting the controller 50. Other than that, some of functions of individual elements of the controller may be constituted of a custom IC.

The controller 50 is connected with the stacker cranes 9 by cable or wireless. The controller 50 controls the travelling of the stacker cranes 9 and the transfer of articles A by the stacker cranes 9. The controller 50 is connected with the transport vehicles 5 by cable or wireless. The controller 50 controls the travelling of the transport vehicles 5 and the operation of the lifter 25 of the transport vehicle 5.

The controller 50 is connected with the travelling restriction device 41, specifically with the driving device 45.

Although not shown, the controller 50 is connected with sensors that detect a size, a shape and a position of an article, sensors and switches that detect conditions of the devices, and an information input device.

(10) Control Operation

Figure 8:
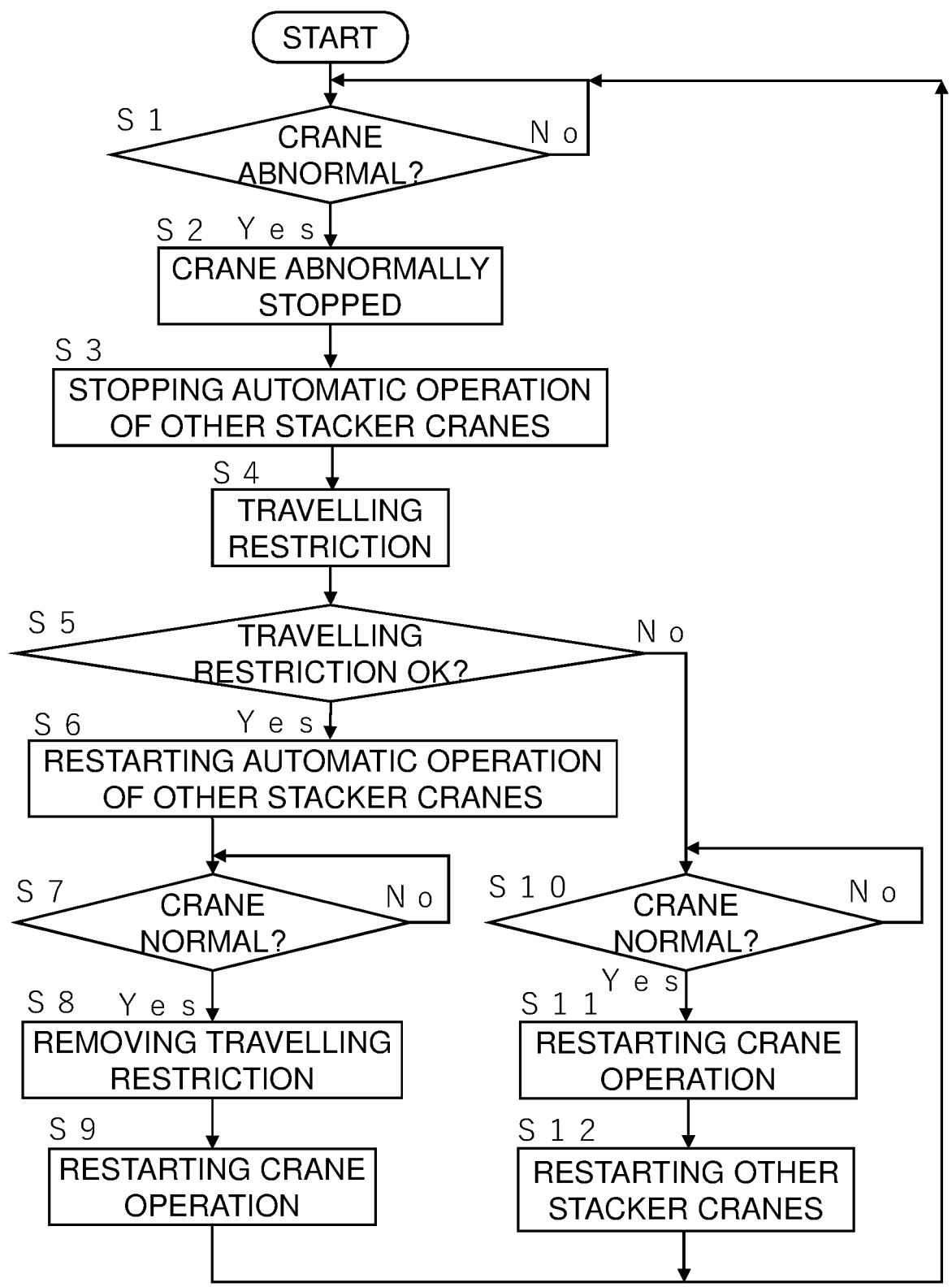
FIG. 8 is a flowchart illustrating a basic control operation of the automated storeroom system.

Referring to FIG. 8, the basic control operation of the automated storeroom system will be explained. FIG. 8 is a flowchart illustrating a basic control operation of the automated storeroom system.

The control flowchart described below is an example, and each step can be omitted and replaced as necessary. Further, a plurality of steps may be simultaneously executed, or some or all of the steps may be executed in an overlapping manner.

Moreover, each block of the control flowchart is not limited to a single control operation, but can be replaced with a plurality of control operations represented by a plurality of blocks.

An operation of each device is a result of a command from the controller to each device, and the operation is represented by each step of software/application.

At step S1, the controller 50 determines whether or not the stacker crane 9 has abnormalities. If the stacker crane 9 does not have abnormalities, the normal operations of the stacker cranes 9 and the transport vehicles 5 continue. If the stacker crane 9 has abnormalities, the process proceeds to step S2.

At step S2, the controller 50 stops the operation of the stacker crane 9 having abnormalities.

At step S3, the controller 50 stops the automatic operation of other stacker cranes 9 adjacent to the abnormally stopped stacker crane 9. At this time, the automatic operations of the transport vehicles 5 may be stopped that travels in the rack 7 next to the abnormally stopped stacker crane 9.

At step S4, the controller 50 controls the driving device 45 of the travelling restriction device 41 to move the travelling restriction member 43 of the travelling restriction device 41 to the travelling restriction position. In other words, the travelling of the worker is restricted. Accordingly, after step S4, the worker W can enter the crane passage 11 of the stacker crane 9 having abnormalities, and maintain the abnormal stacker crane 9. The travelling of the travelling restriction member 43 to the travelling restriction position may be performed while the above-described devices are operated by the worker W.

At step S5, the controller 50 determines whether or not the travelling restriction member 43 is positioned at the travelling restriction position. This determination is based on a sensor (not shown) or a switch operation by the worker W. If the travelling restriction member 43 is positioned at the travelling restriction position, the process proceeds to step S6. If the travelling restriction member 43 is not positioned at the travelling restriction position, the process proceeds to step S10.

At steps S6 through S9, the operations will be explained when the travelling restriction member 43 is positioned at the travelling restriction position.

At step S6, the controller 50 restarts the automatic operation of the other stacker cranes 9. At this time, the automatic operation of the transport vehicles 5 may be restarted, too. Specifically, the transport vehicle 5 travels along a travelling route in the rack 7 of the abnormal automated storeroom 3 to load or unload the articles A to or from the other stacker cranes 9 whose automatic operation has been restarted.

At step S7, the controller 50 determines whether or not the stacker crane 9 returns to normal. "The stacker crane 9 returns to normal" means a state in which the abnormalities are eliminated and the worker W has gone out of the crane passage 11.

At step S8, the controller 50 controls the driving device 45 of the travelling restriction device 41 to move the travelling restriction member 43 of the travelling restriction device 41 to the travelling non-restriction position. In other words, the travelling restriction is removed. The movement of the travelling restriction member 43 may be performed while the above-described devices are operated by the worker W.

At step S9, the controller 50 restarts the operation of the stacker crane 9 that had abnormalities in the past.

At steps S10 through S12, the operations will be explained when the travelling restriction member 43 is not positioned at the travelling restriction position.

Steps S10 and S11 correspond to step S7 and S8, respectively.

At step S12, the controller 50 restarts the automatic operations of the other stacker cranes 9. In other words, if the travelling restriction member 43 is not positioned at the travelling restriction position, the automatic operations of the other stacker cranes 9 are not restarted until the concerned automated storeroom 3 is recovered. At this time, as at step S6, the automatic operation of the transport vehicles 5 may be restarted.

As described above, while the crane is under maintenance (e.g., steps S2 through S8), the controller 50 performs the automatic operations of the other stacker cranes 9 (step S6) if the controller 50 determines that the travelling restriction member 43 is positioned at the travelling restriction member 43 (Yes at step S5) even if the next automated storeroom 3 is under maintenance. In this configuration, the controller 50 also performs the operations of the transport vehicles 5.

As described above, even if the stacker crane 9 is under maintenance, a stacker crane 9 belonging to a rack 7 next to a stacker crane 9 under maintenance can transfer the articles A. Accordingly, it is possible to reduce the impact on the overall operation of the automated storeroom system 1 due to the maintenance.

A first modification of the above-described control flowchart will be explained. Although the automatic operation of the transport vehicle 5 is stopped at step S3 in the above-described configuration, the performed control is not limited to the stop of the automatic operation. The reason is that as long as the transport vehicles 5 do not travel along the travelling route (e.g., the routes 21A through 21C), it is satisfactory. Specifically, the transport vehicle 5 may be prohibited from travelling along the travelling routes by the high-order controller at step S3. In this configuration, at step S6 and step S12 described above, a transport vehicle 5 is allowed to travel along the above-described travelling routes by the high-order controller.

A second modification of the above-described control flowchart will be explained. Although the operation of the stacker crane 9 belonging to an automated storeroom 3 next to an automated storeroom 3 under maintenance is restarted at step S6 and step S12 in the above-described configuration, it does not necessarily have to start the operation of the next stacker crane 9. For example, if the lower passage of the concerned rack 7 is a shortcut, only the travelling of the transport vehicle 5 may be restarted at step S6 and step S12 described above, without allowing the operation of the next stacker crane 9.

2. Second Example

In the first example the number of the stacker crane 9 is one in each of the automated storerooms 3. A plurality of the stacker cranes 9 may be installed in the automated storeroom.

Figure 9:
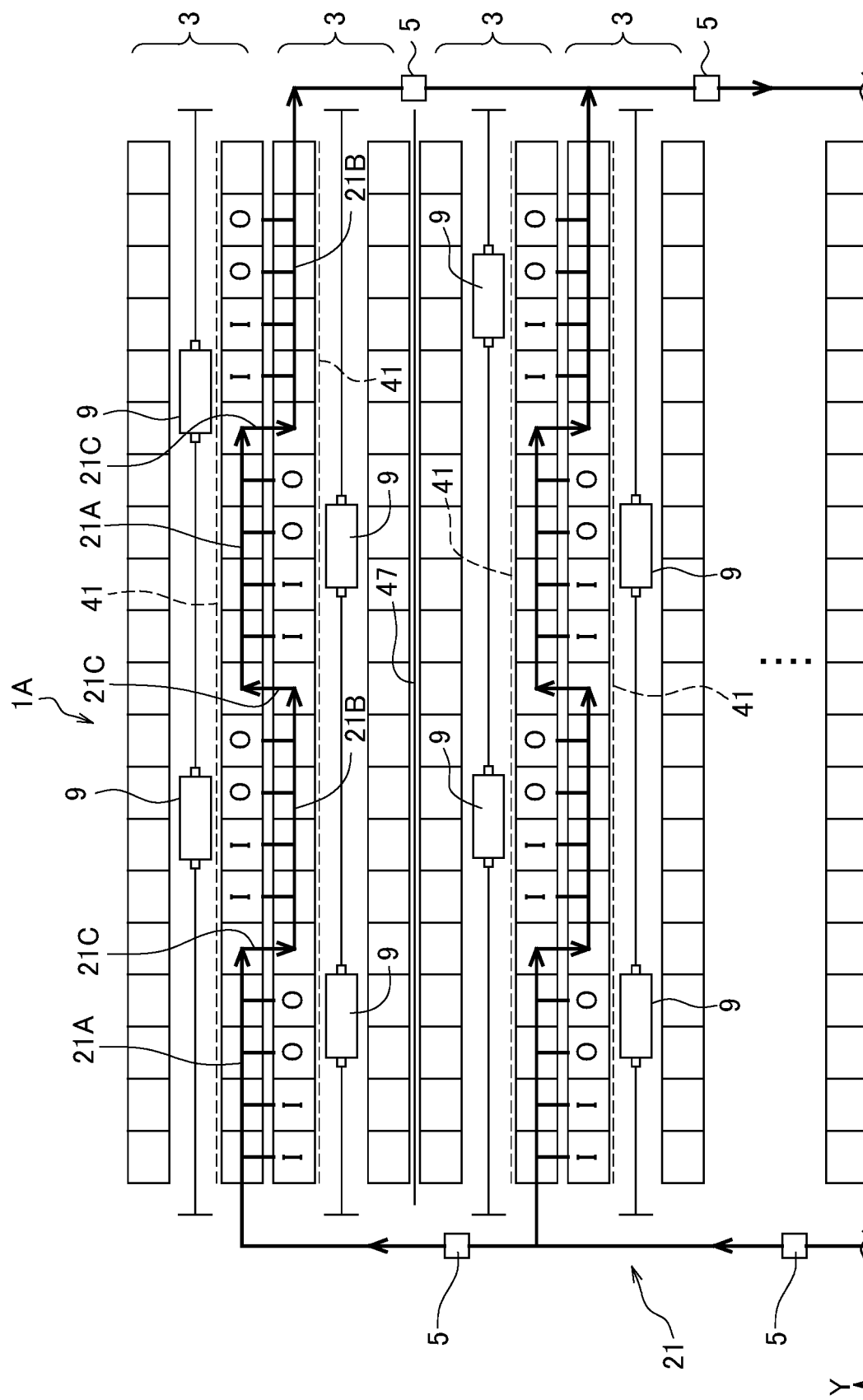
FIG. 9 is a schematic plan view illustrating an arrangement structure of an automated storeroom system according to a second example.

Referring to FIG. 9, such a modification will be explained as a second example. FIG. 9 is a schematic plan view illustrating an arrangement structure of an automated storeroom system according to a second example. In this example, points different from the first example will be explained.

As shown in FIG. 9, in an automated storeroom system 1A according to the second example, each automated storeroom 3 includes two stacker cranes 9 arranged in series. The route 21 along which the transport vehicles 5 travel includes two first routes 21A, two second routes 21B, and three connection routes 21C. In this example, the first routes 21A are disposed at a first end of the lower portion of the first rack 7A and a central vicinity near a second end in the first horizontal direction. The second routes 21B are disposed at the second end and a central vicinity near the first end of the second rack 7B in the first horizontal direction. The connection routes 21C are disposed at positions dividing the first rack 7A and the second rack 7B by four in the first horizontal direction.

The transport vehicle 5 travels through the lower portions of the first rack 7A and the lower portions of the second rack 7B. The transport vehicle 5 travels along the first route 21A, shifts to the second route 21B via the connection route 21C, travels along the second route 21B, and then shifts to the first route 21A via the connection route 21C, travels again along the first route 21A, shifts to the second route 21B via the connection route 21C, and travels along the second route 21B. The transport vehicle 5 travels between the lower portions of the first rack 7A and the lower portions of the second rack 7B in a square wave.

This enables many articles A to be loaded and unloaded in a small space in the automated storeroom system 1A. In the automated storeroom system 1A, it is possible to load or unload the articles A to or from the storeroom 3 having the two stacker cranes 9, and to load or unload more articles A to or from the automated storeroom 3. In addition, even if a plurality of stacker cranes 9 are introduced into the travelling rails 12, the number of cranks (connection routes 21C) constituted of the first route 21A and the second route 21 is configured to increase according to the number of the stacker cranes 9, thereby fully demonstrating the loading and unloading capability of the introduced number of the stacker cranes 9.

Each automated storeroom 3 may include three or more stacker cranes 9. In this example, a route 21 along which the transport vehicle 5 travels includes three or more first routes 21A, three or more second routes 21B, and four or more connection routes 21C.

In the automated storeroom system 1A according to the second example, as in the first example, the travelling restriction device 41 is provided, thereby obtaining the same effects.

3. Third Example

In the first example, the travelling restriction device 41 is provided generally between the crane passage 11 and the front part of the rack 7 facing the crane passage 11. However, since the travelling restriction device 41 has only to be provided at the opening portions 7b corresponding to the loading ports 13 and the unloading ports 15 of the rack 7, the travelling restriction device is not limited to one in the first example.

Figure 10:
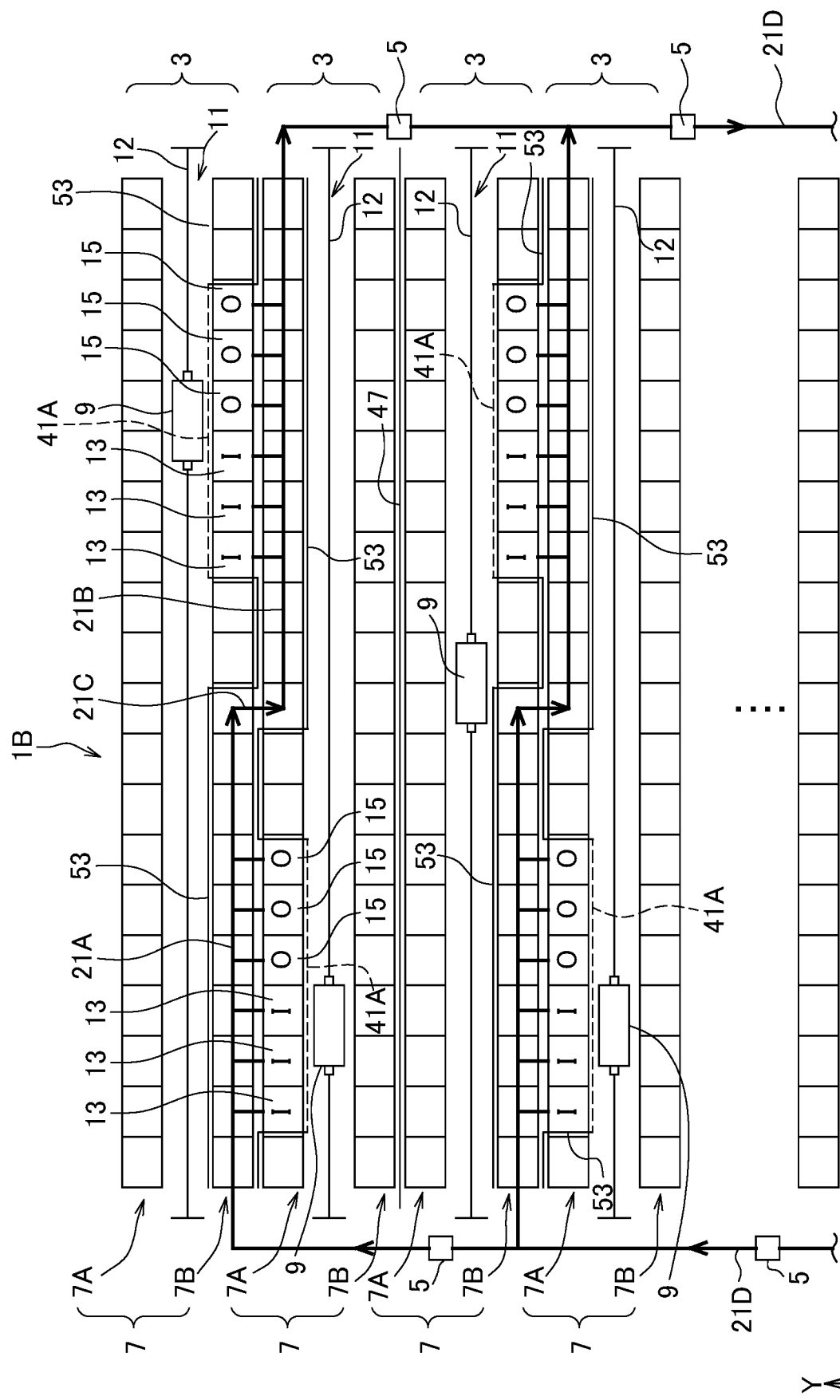
FIG. 10 is a schematic plan view illustrating an arrangement structure of an automated storeroom system according to a third example.

Referring to FIG. 10, such a modification will be explained as a third example. FIG. 10 is a schematic plan view illustrating an arrangement structure of an automated storeroom system according to a third example. In this example, points different from the first example will be explained.

An automated storeroom system 1B includes a travelling restriction device 41A. The travelling restriction device 41A is provided, in plan view, only at the opening portions 7b of the loading ports 13 and the unloading ports 15 near the crane passage 11. In other words, the travelling restriction device 41A is disposed only at the front parts of the loading ports 13 and the unloading ports 15 to or from which the stacker cranes 9 transfer the article A. Accordingly, during the normal operation, the travelling restriction member is positioned at the travelling non-restriction position so that the stacker crane 9 can access the loading ports 13 and unloading ports 15. When the stacker crane 9 is abnormally stopped, the worker W cannot travel to the other crane passage 11 because the travelling restriction member is positioned at the travelling restriction position.

The automated storeroom system 1B includes a fixed travelling restriction member 53 (one example of the second travelling restriction member). The fixed travelling restriction member 53 is disposed between the crane passage 11 and the front part of the rack 7 facing the crane passage 11, where the travelling restriction device 41A does not exist. The fixed travelling restriction member 53 is, specifically, fixed at a portion facing the crane passage 11. As long as the travelling of the worker W is limited, it is satisfactory. Accordingly, a part of the fixed travelling restriction member 53 is provided at the back part and the side parts of the lowest shelves 7a where the travelling route of the transport vehicle 5a as well as the loading port 13 and the unloading port 15 do not exist. Accordingly, the stacker crane 9 can access the lowest shelf 7a of those ports. If the above-described lowest shelves 7a are not used, the fixed travelling restriction member 53 may be disposed between the crane passage 11 and a front face of the rack facing the crane passage 11 with a simple structure.

According to this system, providing the fixed travelling restriction member 53 makes it possible to decrease the location of the travelling restriction devices 41A.

4. Fourth Example

Figure 11:
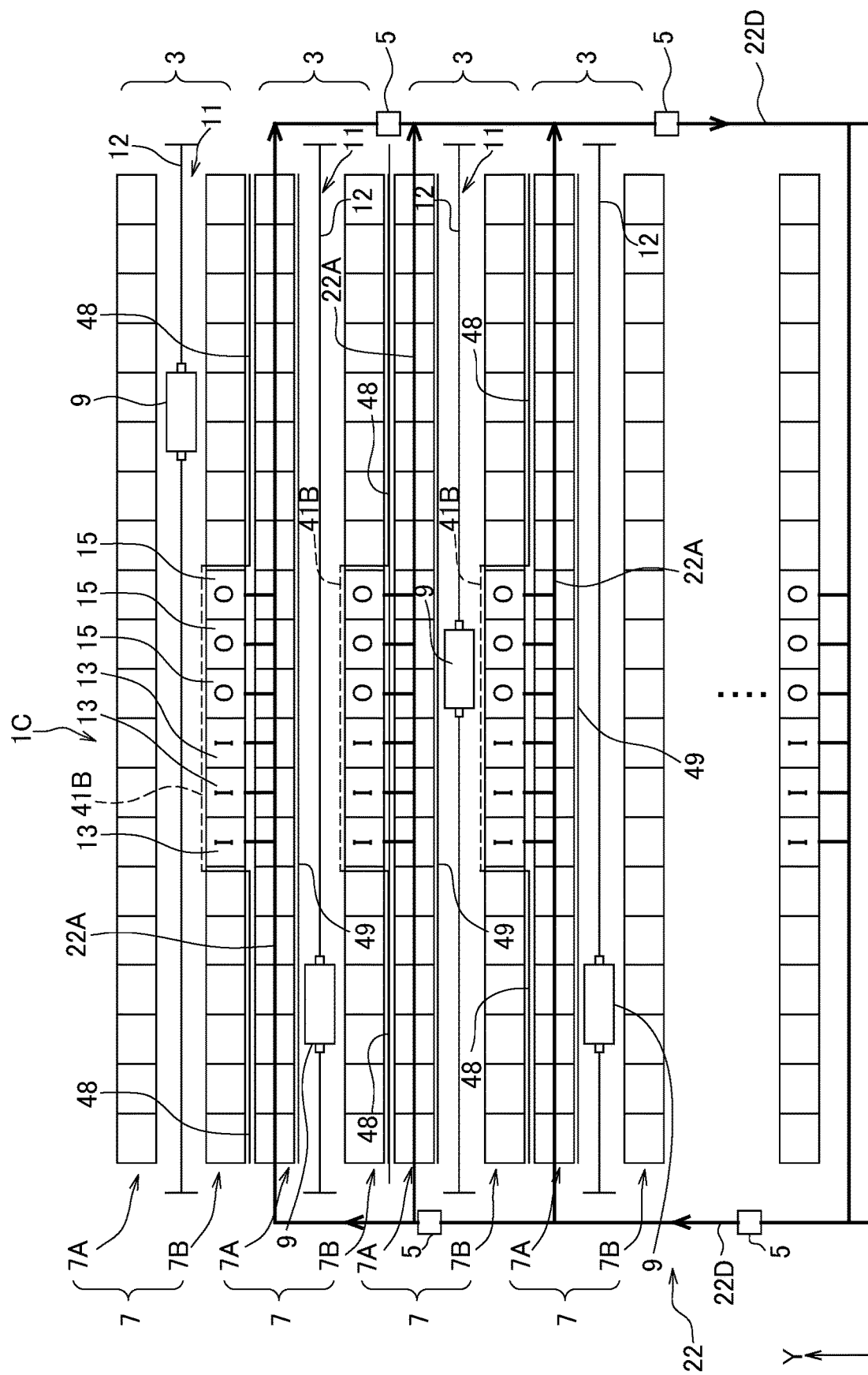
FIG. 11 is a schematic plan view illustrating an arrangement structure of an automated storeroom system according to a fourth example.

Referring to FIG. 11, an example will be explained in which the travelling restriction device 41 is provided only at the opening portions 7b of the rack 7 that corresponds to the loading ports 13 and the unloading ports 15 as in the third example. FIG. 11 is a schematic plan view illustrating an arrangement structure of an automated storeroom system according to a fourth example.

The automated storeroom system 1C includes a route 22 along which the transport vehicle 5 travels.

The route 22 includes a plurality of fourth routes 22A and a circulation route 22D. Each fourth route 22A is provided in the first rack 7A that is disposed adjacent to the second rack 7B, wherein the first rack 7A and the second rack 7B belong to different automated storerooms 3 and disposed adjacent to each other back to back.

The fourth route 22A passes through the lower portions of the first rack 7A in the first horizontal direction. According to this example, the fourth route 22A is provided from one end of the lower portion of the first rack 7A to the other end of the first rack 7A in the first horizontal direction.

Above the fourth route 22A, a passing space is provided to allow the transport vehicles 5 to pass therethrough. The passing space extends passing through the first rack 7A in the first horizontal direction. In the passing space, structural members such as lattices are not provided.

Along the fourth route 22A, the transport vehicle 5 can travel to the second rack 7B and transfer the article A from or to the second rack 7B. In the lower portions of the second rack 7B, where the article A is transferred to or from the transport vehicle 5 that has travelled from the fourth route 22A, the loading ports 13 and the unloading ports 15 are provided.

The loading port 13 is, at a level corresponding to the lowest shelf 7a of the rack 7, provided in plurality (herein, three) in a row to be adjacent to each other in the first horizontal direction. The unloading port 15 is, at a level corresponding to the lowest shelf 7a of the rack 7, provided in plurality (herein, three) in a row to be adjacent to each other in the first horizontal direction. A group consisting of the unloading ports 15 and a group consisting of the loading ports 13 are adjacent to each other in the first horizontal direction.

A transfer space is defined between the lower portions of the first rack 7A and the lower portions of the second rack 7B through which the transport vehicle 5 can travel. The transfer space extends passing through the first rack 7A and the second rack 7B in the second horizontal direction. In the transfer space, structural members such as lattices and back-side braces are not provided.

The circulation route 22D is connected with the fourth route 22A outside the rack 7. The circulation route 22D is a one-way route along which the transport vehicle 5 travels in one direction.

In this example, the circulation route 22D is connected with upstream sides of the fourth routes 22A outside the rack 7. The circulation route 22D is connected with the downstream sides of the fourth routes 22A outside the rack 7. The circulation route 22D continuously extends from the downstream sides of the fourth routes 22A to the upstream sides of the fourth routes 22A.

The automated storeroom system 1C includes a travelling restriction device 41B. The travelling restriction device 41B is provided, in plan view, only at the opening portions 7b of the loading ports 13 and the unloading ports 15 near the crane passage 11. In other words, the travelling restriction device 41B is disposed only at the front parts of the loading ports 13 and the unloading ports 15, where the stacker crane 9 has to perform the transfer. Accordingly, during the normal operation, the travelling restriction member 43 is positioned at the travelling non-restriction position so that the stacker crane 9 can access the loading ports 13 and the unloading ports 15. If the stacker crane 9 is abnormally stopped, the travelling restriction member 43 is moved to the travelling restriction position so that worker W cannot travel to the other crane passage 11.

The automated storeroom system 1C includes a first fixed travelling restriction member 48 (one example of the second travelling restriction member). The first fixed travelling restriction member 48 is provided at a rear part and side parts of the lowest shelf 7a of the second rack 7B where the loading port 13 and the unloading port 15 do not exist. However, if the above-mentioned lowest shelves 7a are not used, it is possible to make the first fixed travelling restriction member 48 straight with a simple structure.

The automated storeroom system 1C includes a second fixed travelling restriction member 49 (one example of the second travelling restriction member). The second fixed travelling restriction member 49 is disposed in linear generally between the crane passage 11 and the front part of the first rack 7A.

In this system, providing the first fixed travelling restriction member 48 and the second fixed travelling restriction member 49 makes it possible to decrease the location of the travelling restriction devices 41B.

5. Fifth Example

Although the travelling restriction member of the travelling restriction device is a net in the first example, the travelling restriction member may be any one as long as it restricts the travelling of the worker W in any way.

Figure 12:
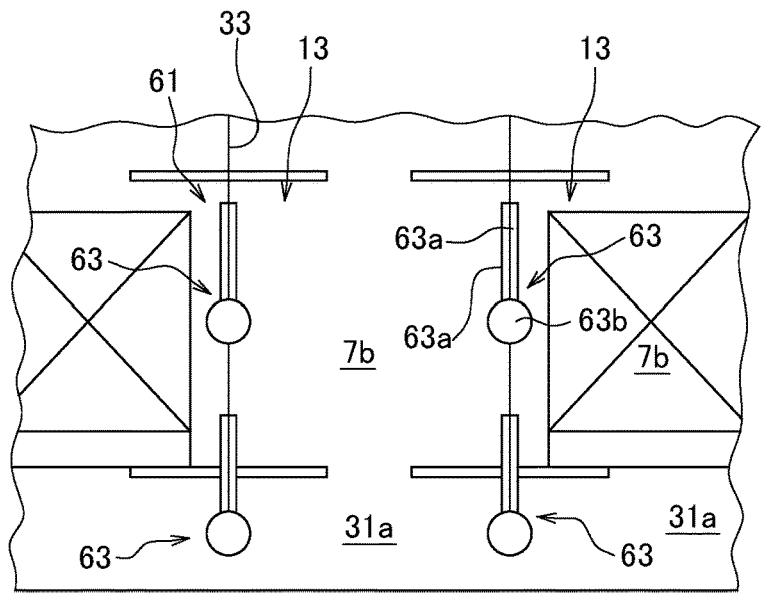
FIG. 12 is a view illustrating a loading port of the rack seen from the crane passage in the automated storeroom system according to a fifth example.
Figure 13:
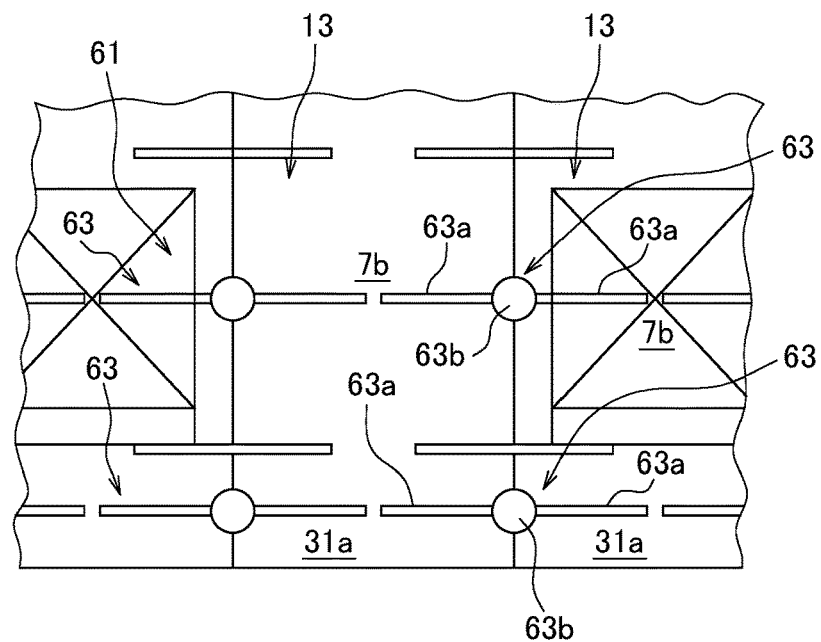
FIG. 13 is a view illustrating a loading port of the rack seen from the crane passage in the automated storeroom system according to the fifth example.
Figure 14:
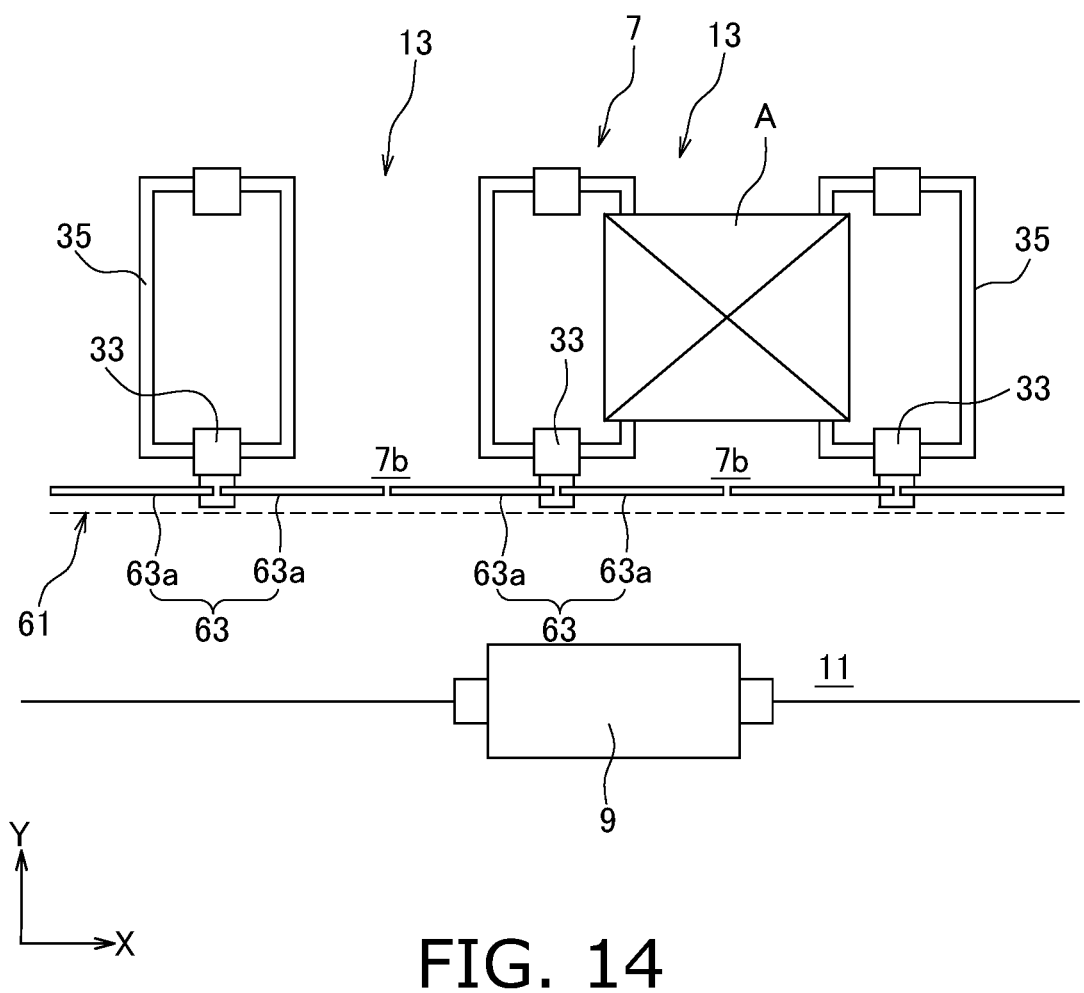
FIG. 14 is a schematic plan view illustrating a loading port of the rack of the automated storeroom system according to the fifth example.

Referring to FIGS. 12 through 14, such a modification will be explained as a fifth example. FIGS. 12 and 13 are views illustrating a loading port of the rack seen from the crane passage in the automated storeroom system according to a fifth example. FIG. 14 is a schematic plan view illustrating a loading port of the rack of the automated storeroom system according to the fifth example.

This automated storeroom system includes a travelling restriction device 61. The travelling restriction device 61 includes a plurality of travelling restriction members 63. The travelling restriction member 63 is disposed, as shown in FIG. 14, in plan view, between the crane passage 11 and a front part of the rack 7 facing the crane passage 11. The travelling restriction member 63 can move between a travelling restriction position for restricting the travelling of the worker W and a travelling non-restriction position for removing the restriction.

Specifically, the travelling restriction member 63 is a stick-like member, and has one end rotatably supported by a post 33. More specifically, the travelling restriction member 63 has a pair of stick-like members 63a, and a support portion 63b fixed to the post 33 and rotatably supporting the stick-like members 63a. The travelling restriction members 63 are disposed at a level corresponding to the opening portions 7b of the loading ports 13 and at a level corresponding to the underneath entering space 31a, along one post 33. As shown in FIG. 14, the travelling restriction member 63 is disposed out of a boundary line P of the crane passage 11.

The travelling restriction member 63 takes, as shown in FIG. 12, a standing posture along the post 33 at the travelling non-restriction position.

The travelling restriction member 63 takes, as shown in FIG. 13, a lying posture to form a partition at the lowest opening portion 7b (the opening portion 7b of the loading port 13) of the rack 7 and the underneath entering space 31a at the travelling restriction position. Specifically, the pair of travelling restriction members 63 is open sideward, and their ends are close to each other in the first horizontal direction.

The travelling restriction device 41 includes a driving device (not shown) that drives the travelling restriction member 63. The driving device has a motor that rotates the travelling restriction member 63. Accordingly, the travelling restriction member 43 can take a standing posture at the travelling non-restriction position and a lying posture at the travelling restriction position.

Accordingly, while the stacker crane 9 is under maintenance, it is possible to dispose the travelling restriction member 63 at the travelling restriction position. Accordingly, the worker W maintaining the stacker crane 9 cannot travel from the concerned crane passage 11 to the next crane passage 11, thereby ensuring the safety of the worker W. As a result, stacker cranes 9 other than a stacker crane 9 under maintenance can be operated.

According to this automated storeroom system, it is possible to realize the travelling restriction member 63 with a simple structure.

A sensor may be provided that detects invasion by hands or legs of the worker W through gaps of the travelling restriction member 63. In this example, the dangerous state is notified to the worker W based on the detected information, thereby improving the safety.

6. Common Matters Among the Examples

The above-described first through fifth examples commonly have the following configuration and function.

An automated storeroom system (e.g., automated storeroom systems 1, 1A, 1B, and 1C) includes a plurality of automated storerooms (e.g., a plurality of automated storerooms 3), a transport vehicle (e.g., a transport vehicle 5), a travelling restriction member (e.g., travelling restriction members 43 and 63). The automated storerooms extend in a first horizontal direction (e.g., an arrow X), and have a rack (e.g., a rack 7) having a plurality of shelves (e.g., shelves 7a), and a stacker crane (e.g., a stacker crane 9) that can travel along a passage (e.g., a crane passage 11) along the rack. The automated storerooms are arranged in a second horizontal direction (e.g., an arrow Y) perpendicular to the first horizontal direction such that back parts of the racks are adjacent to each other. The transport vehicle can travel along a transport vehicle travelling passage (e.g., a route 21) provided in a lower portion of the rack and extending in the first horizontal direction. The travelling restriction member is disposed between the crane passage and a front part of the rack facing the crane passage. The travelling restriction member can move between a travelling restriction position for restricting the travelling of the worker (e.g., a worker W) and a travelling non-restriction position for removing the restriction.

In the above-described automated storeroom system, when the stacker crane is under maintenance, it is possible to dispose the travelling restriction member at the travelling restriction position. Accordingly, the worker maintaining the stacker crane cannot travel from the concerned crane passage to a next crane passage, thereby ensuring the safety of the worker. As a result, it is possible to operate stacker cranes other than the stacker crane under maintenance.

7. Other Examples

Multiple examples were explained above, but this disclosure is not limited to these examples, and various modifications are possible within a scope that does not depart from the appended claims. In particular, the examples and modified examples herein can be arbitrarily combined as needed.

For example, the fifth example can be applied to any of the first through fourth examples.

The kind of the travelling restriction device is not limited to ones in the first through fifth examples. For example, the travelling restriction device may be a device configured to move a plurality of bars in the vertical direction. The bars extend in a horizontal direction. The bars can switch a travelling restriction position to and from a travelling non-restriction position.

Although the transport vehicle moves from a route of the rack toward the loading port or the unloading port and then transfers the article in the first through the fifth example, the transport vehicle may have a transfer device such as a slide fork to transfer the article when the transport vehicle is on the route.

The travelling restriction member in the first example may be a sheet-like member other than a net.

INDUSTRIAL APPLICABILITY

My systems can be widely applied to the automated storeroom system.

The invention claimed is:
1. An automated storeroom system comprising:
    a plurality of automated storerooms including a rack extending in a first horizontal direction and having a plurality of shelves, and a stacker crane configured to travel on a crane passage along the rack, the automated storerooms disposed adjacent to each other in a second horizontal direction perpendicular to the first horizontal direction with back parts of the racks being close to each other;

a transport vehicle configured to travel along a transport vehicle travelling passage provided in a lower portion of the rack and extending in the first horizontal direction; and a travelling restriction member disposed between the crane passage and a front part of the rack facing the crane passage, the travelling restriction member being movable between a travelling restriction position that restricts travelling of a worker and a travelling non-restriction position adapted to remove the restriction.

2. The automated storeroom system according to claim 1, further comprising a controller configured to perform automatic operation of the stacker cranes, wherein the controller performs the automatic operation of the stacker crane when the controller determines that the travelling restriction member is positioned at the travelling restriction position even if an automated storeroom next to the concerned automated storeroom is under maintenance.

3. The automated storeroom system according to claim 2, wherein, if one of the stacker cranes is abnormally stopped, the controller performs:

stopping the automatic operation of other stacker cranes;

moving the travelling restriction member from the travelling restriction position to the travelling non-restriction position; and restarting the automatic operation of the other stacker cranes.

4. The automated storeroom system according to claim 2, wherein the travelling restriction member is in a retreat position lower than an opening portion of the lowest shelf of the rack when the travelling restriction member is positioned at the travelling non-restriction position, and the travelling restriction member is in a partition position to form a partition at the opening portion of the lowest shelf when the travelling restriction member is positioned at the travelling restriction position.

5. The automated storeroom system according to claim 4, wherein the travelling restriction member is a member flexible with a predetermined rigidity, and the travelling restriction member takes a wound posture at the travelling non-restriction position, and an upwardly unwound posture at the travelling restriction position.

6. The automated storeroom system according to claim 3, wherein the travelling restriction member is a stick shaped member, the travelling restriction member takes a standing posture near a side frame of the opening portion of the lowest shelf of the rack when the travelling restriction member is positioned at the travelling non-restriction position, and the travelling restriction member takes a lying posture partitioning the opening portion of the lowest shelf of the rack off the crane passage when the travelling restriction member is positioned at the travelling restriction position.

7. The automated storeroom system according to claim 2, wherein the travelling restriction member is a stick shaped member, the travelling restriction member takes a standing posture near a side frame of the opening portion of the lowest shelf of the rack when the travelling restriction member is positioned at the travelling non-restriction position, and the travelling restriction member takes a lying posture partitioning the opening portion of the lowest shelf of the rack off the crane passage when the travelling restriction member is positioned at the travelling restriction position.

8. The automated storeroom system according to claim 1, further comprising a controller configured to perform the automatic operation of the transport vehicle, wherein if the controller determines that the travelling restriction member is positioned at the travelling restriction position, the controller allows the transport vehicle to travel along the transport vehicle travelling passage provided in a lower portion of the rack even if an automated storeroom disposed next to the concerned automated storeroom is under maintenance.

9. The automated storeroom system according to claim 8, wherein the travelling restriction member is in a retreat position lower than an opening portion of the lowest shelf of the rack when the travelling restriction member is positioned at the travelling non-restriction position, and the travelling restriction member is in a partition position to form a partition at the opening portion of the lowest shelf when the travelling restriction member is positioned at the travelling restriction position.

10. The automated storeroom system according to claim 9, wherein the travelling restriction member is a member flexible with a predetermined rigidity, and the travelling restriction member takes a wound posture at the travelling non-restriction position, and an upwardly unwound posture at the travelling restriction position.

11. The automated storeroom system according to claim 8, wherein the travelling restriction member is a stick shaped member, the travelling restriction member takes a standing posture near a side frame of the opening portion of the lowest shelf of the rack when the travelling restriction member is positioned at the travelling non-restriction position, and the travelling restriction member takes a lying posture partitioning the opening portion of the lowest shelf of the rack off the crane passage when the travelling restriction member is positioned at the travelling restriction position.

12. The automated storeroom system according to claim 1, wherein the travelling restriction member is in a retreat position lower than an opening portion of the lowest shelf of the rack when the travelling restriction member is positioned at the travelling non-restriction position, and the travelling restriction member is in a partition position to form a partition at the opening portion of the lowest shelf when the travelling restriction member is positioned at the travelling restriction position.

13. The automated storeroom system according to claim 12, wherein the travelling restriction member is a member flexible with a predetermined rigidity, and the travelling restriction member takes a wound posture at the travelling non-restriction position and takes an upwardly unwound posture at the travelling restriction position.

14. The automated storeroom system according to claim 1, wherein the travelling restriction member is a stick shaped member, the travelling restriction member takes a standing posture near a side frame of the opening portion of the lowest shelf of the rack when the travelling restriction member is positioned at the travelling non-restriction position, and the travelling restriction member takes a lying posture partitioning the opening portion of the lowest shelf of the rack off the crane passage when the travelling restriction member is positioned at the travelling restriction position.

15. The automated storeroom system according to claim 1, further comprising a second travelling restriction member disposed between the crane passage and a front part of the rack facing the crane passage, the second travelling restriction member being fixed to a portion facing the crane passage.

* * * * *